(12) United States Patent
Atkinson

(10) Patent No.: US 7,237,502 B1
(45) Date of Patent: Jul. 3, 2007

(54) BOAT BUMPER

(75) Inventor: Darin Atkinson, Miami, OK (US)

(73) Assignee: Boat Guard International, Inc., Miami, OK (US)

( * ) Notice: Subject to any disclaimer, the term of this patent is extended or adjusted under 35 U.S.C. 154(b) by 0 days.

(21) Appl. No.: 11/307,124

(22) Filed: Jan. 24, 2006

(51) Int. Cl.
*B63B 59/02* (2006.01)

(52) U.S. Cl. .................. 114/219; 405/212; 405/214

(58) Field of Classification Search .............. None
See application file for complete search history.

(56) References Cited

U.S. PATENT DOCUMENTS

| | | | |
|---|---|---|---|
| 799,645 A | 9/1905 | Grimm | |
| 2,420,677 A * | 5/1947 | Peterson | ............ 405/212 |
| 2,652,694 A | 9/1953 | Melges | |
| 2,754,792 A | 7/1956 | Baird | |
| 3,084,517 A | 4/1963 | Bell | |
| 3,145,685 A | 8/1964 | Kulick, Sr. | |
| 3,151,595 A | 10/1964 | Stainbrook | |
| 3,177,839 A | 4/1965 | Nolf | |
| 3,336,896 A | 8/1967 | Burnett | |
| 4,227,832 A * | 10/1980 | Leone et al. | ............ 405/215 |
| 4,679,517 A | 7/1987 | Kramer | |
| 4,804,296 A | 2/1989 | Smath | |
| 4,920,907 A | 5/1990 | Richter | |
| 5,113,702 A | 5/1992 | Capps | |
| 5,911,189 A | 6/1999 | Ryan | |
| 6,112,690 A * | 9/2000 | Anderson | ............ 114/220 |
| 6,406,221 B1 * | 6/2002 | Collier | ............ 405/213 |
| 6,513,449 B1 * | 2/2003 | Stewart et al. | ............ 114/219 |
| 6,601,530 B2 * | 8/2003 | Barmakian et al. | ........ 114/219 |
| 2006/0130727 A1* | 6/2006 | Eischeid | ............ 114/219 |

* cited by examiner

*Primary Examiner*—Lars A. Olson
(74) *Attorney, Agent, or Firm*—Hovey Williams LLP

(57) ABSTRACT

A boat bumper for use on a boat dock includes a bumper body and a frame. The frame includes uprights and connectors that interconnect the uprights and permit the frame to deflect when a force is applied to the boat bumper. The body includes a base and a roller insert that is rotatably received within the base. The base and roller insert are plastic and include a phosphorescent material that permits the bumper body to be viewed in low-light conditions.

36 Claims, 11 Drawing Sheets

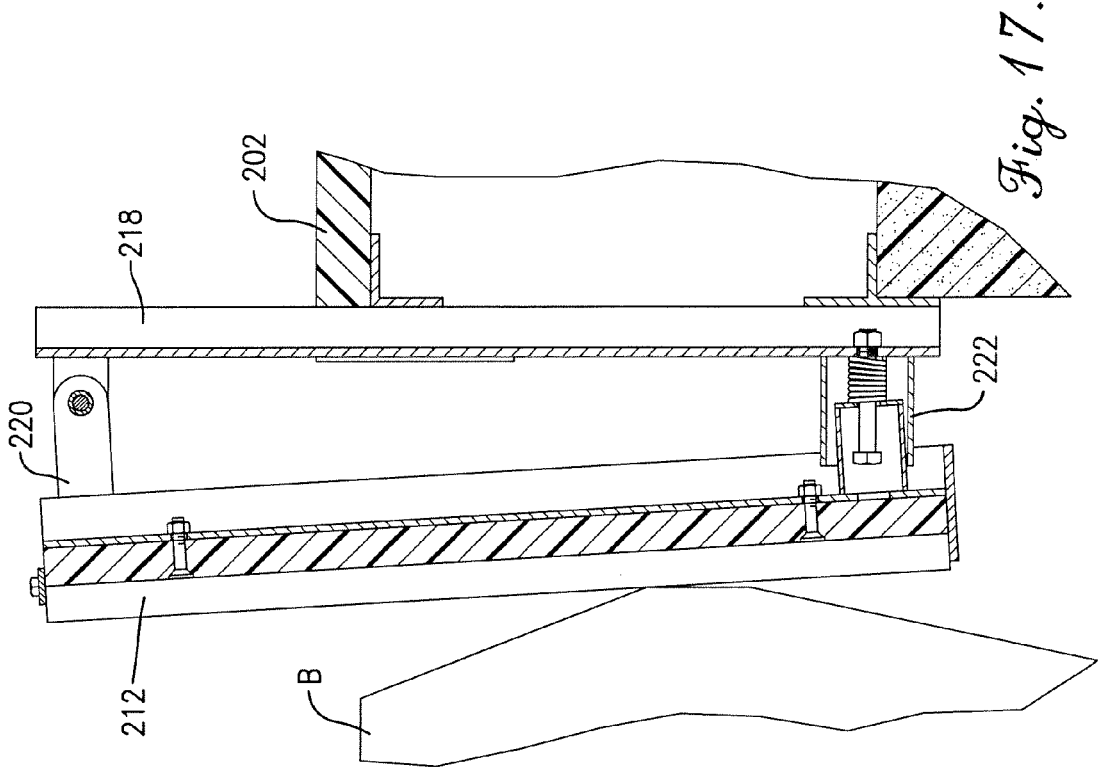
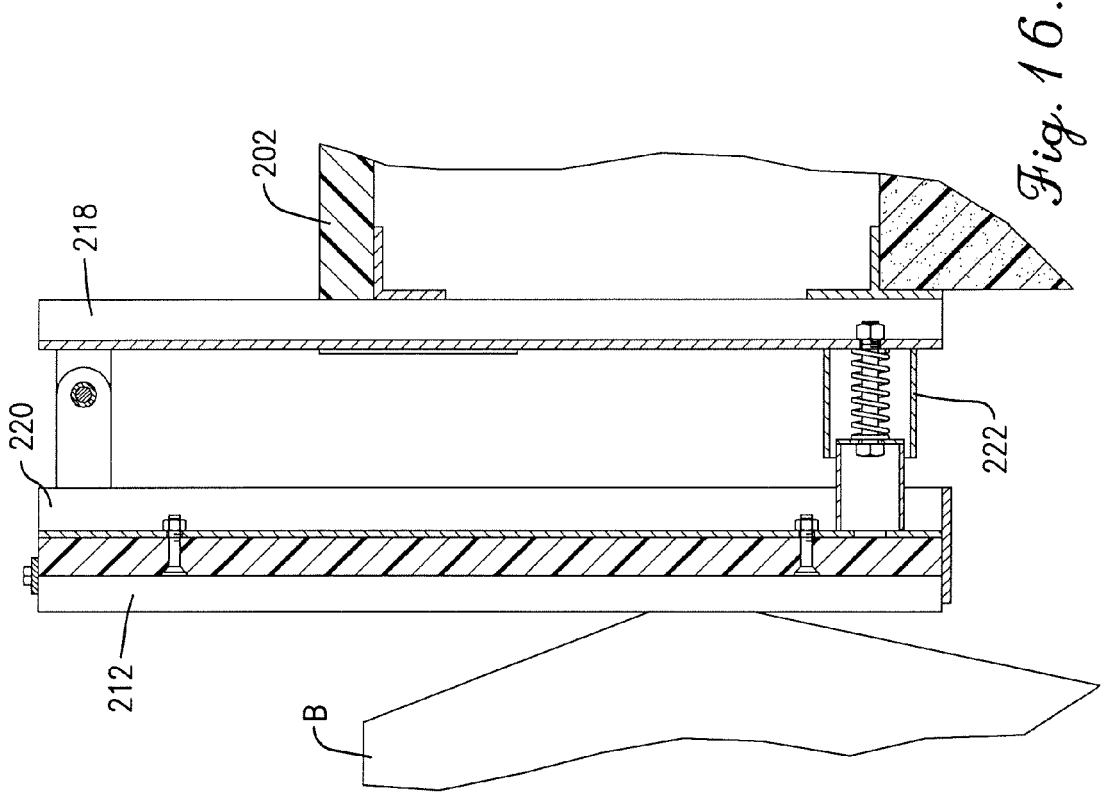

BOAT BUMPER

BACKGROUND OF THE INVENTION

1. Field of the Invention

The present invention relates generally to the field of boat storage devices. More specifically, the present invention concerns a cushioning bumper for use in storing or supporting boats.

2. Discussion of Prior Art

Cushioning bumpers used in storing, supporting, or securing boats are known in the art. Such bumpers are found on boat trailers and on docks to prevent the underlying structure from damaging an adjacent boat. Prior art bumpers generally include a soft material that is intended for contacting a boat hull without scratching or otherwise damaging the hull. Other prior art bumpers involve a roller that rotates upon engagement with the boat.

Prior art boat bumpers are problematic and suffer from certain limitations. In particular, the prior art boat bumpers do not provide adequate cushioning when being contacted by a boat. Moreover, these bumpers have a tendency to either cause structural or cosmetic damage to the boat or to a boat-securing structure in the event that a boat is berthed at excessive speeds. The lack of cushioning also tends to promote inadvertent shifting of people or items within the boat upon contact with the bumper and thereby enhances the potential for injury or damage.

Additionally, the prior art boat bumpers can be dangerous and ineffective. Prior art bumpers, particularly those that incorporate a roller, present locations where fingers or clothing can become unsafely pinched or snagged. The prior art bumpers are also generally difficult for a boat operator to see and, thus, inhibit safe docking of the boat. Accordingly, there is a need for an improved boat bumper that does not suffer from these problems and limitations.

OBJECTS AND SUMMARY OF THE INVENTION

The present invention provides an improved boat bumper that does not suffer from the problems and limitations of the prior art boat bumpers detailed above. A first aspect of the present invention concerns a boat bumper for attachment to a boat securement in which a boat is secured. The boat bumper broadly includes a body and a frame operable to attach the body to the boat securement and permit limited relative movement therebetween. The body is configured to engage the boat within the boat securement. The body includes spaced apart first and second ends, a longitudinal axis extending between the ends, and a boat-engagement surface extending along the longitudinal axis of the body. The frame includes a mechanism that supports the body for pivoting movement about a pivot axis that is substantially perpendicular to the longitudinal axis. The mechanism includes a hinged connector defining the pivot axis.

A second aspect of the present invention concerns a boat bumper for attachment to a boat securement in which a boat is secured. The boat bumper broadly includes a bumper body attachable to the boat securement and configured to engage the boat within the boat securement. The bumper body includes a substantially rigid base and a cylindrical roller. The roller includes a circumferential contacting surface operable to engage the boat. The base presents a socket rotatably receiving the roller therein such that the roller is operable to rotate relative to the base in response to engagement with the boat. The socket is dimensioned and configured so that the base extends about at least half of the contacting surface to thereby retain the roller within the socket.

A third aspect of the present invention concerns a boat bumper for attachment to a boat securement in which a boat is secured. The boat bumper broadly includes a bumper body removably attached to the boat securement and configured to engage the boat within the boat securement. The body includes a phosphorescent section so that the body can be viewed in otherwise low-light conditions adjacent the body. The body includes a longitudinal axis, spaced apart first and second ends, and a boat-engagement surface extending along the longitudinal axis of the base and between the ends. The phosphorescent section extends between the first end and second ends to provide a visual indication corresponding to a location of the surface to facilitate direction of the boat.

A fourth aspect of the present invention concerns a boat bumper for attachment to a boat securement in which a boat is secured. The boat bumper broadly includes a body and a cushioning frame operable to removably attach the body to the boat securement. The body includes a substantially rigid base configured to engage the boat within the boat securement. The base includes a longitudinal axis, spaced apart first and second ends, and a boat-engagement surface extending along the longitudinal axis of the base and between the ends. The frame includes spaced apart sections that are shiftable relative to each other. One of the sections is fixed to the base and another of the sections is configured to be attached to the boat securement. The frame includes a mechanism that interconnects the sections. The mechanism is operable to urge the sections so that the body is located in a neutral position and to permit lateral shifting of the body from the neutral position in response to contact by the boat. The mechanism includes first and second cushioning connectors adjacent to respective first and second ends, with the connectors being operable to absorb forces applied when the boat contacts the boat-engagement surface. At least a portion of the connectors is linearly shiftable from the neutral position to permit lateral translational movement of the body while substantially restricting pivotal movement of the base.

Other aspects and advantages of the present invention will be apparent from the following detailed description of the preferred embodiment and the accompanying drawing figures.

BRIEF DESCRIPTION OF THE DRAWING FIGURES

Several embodiments of the invention are described in detail below with reference to the attached drawing figures, wherein:

FIG. 7 is an enlarged, fragmentary, cross-sectional view of the boat dock shown in FIG. 6, showing the dock entry bumper in a deflected position;

FIG. 16 is a fragmentary, cross-sectional view of the boat dock taken along line 16—16 of FIG. 15, showing the boat bumper in the neutral position as it is initially contacted by the boat's stern; and FIG. 17 is a fragmentary, cross-sectional view of the boat dock similar to FIG. 16, but showing the boat bumper in a deflected position.

Figure 1:
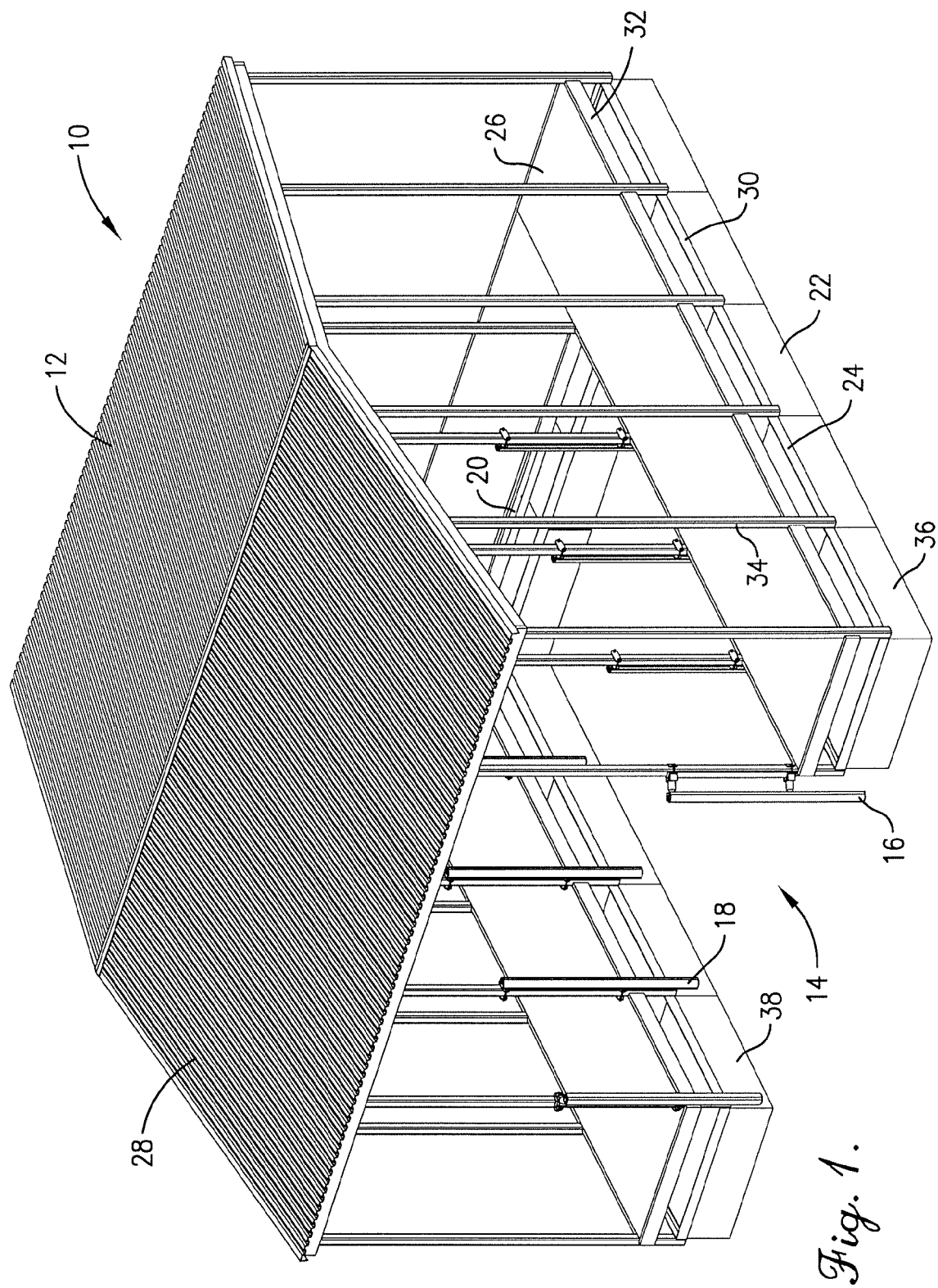
FIG. 1 is a perspective view of a boat dock including a plurality of boat bumpers, each of which is constructed in accordance with the principles of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 2:
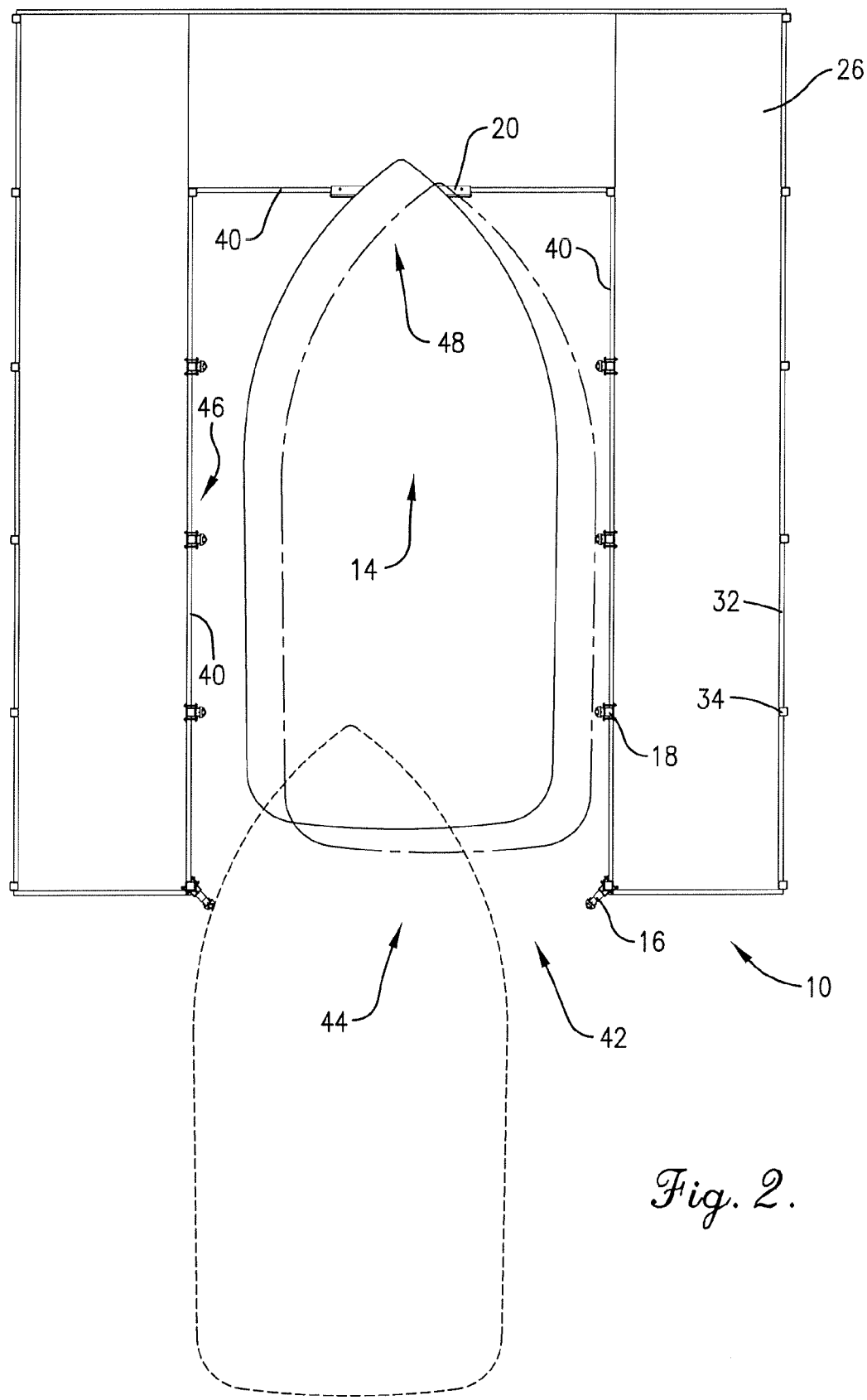
FIG. 2 is a top view of the boat dock shown in FIG. 1, schematically showing positions of a boat wherein the boat contacts various boat bumpers spaced along the boat dock.

A buffered boat dock 10 floats in a waterway (not shown) and receives a boat as illustrated in FIGS. 1 and 2. The boat dock 10, in the usual manner, is useful for securing and supporting a boat therein. While the present invention is depicted and herein described to be in use with the boat dock 10, the principles of the present invention are equally applicable to other boat securement mechanisms that berth, secure, or store a boat, such as a boat trailer. The boat dock 10 broadly includes a covered dock 12, a slip 14, dock entry bumpers 16, side bumpers 18, and end bumper 20.

Referring to FIGS. 1 and 2, the covered dock 12 is a floating dock that provides a suitable berth for a boat B. The dock 12 includes a buoyant foundation 22 and a frame 24 supported on the foundation 22. The dock 12 further includes an elevated floor 26 supported within the frame 24, and a double sloping roof 28 supported by and fixed to the frame 24. The frame 24 includes lateral structural members 30 that rest on the foundation 22 and structural members 32 that support the floor 26. The frame 24 also includes upright stanchions 34 that interconnect members 30,32 and also support the roof 28.

The preferred foundation 22 includes discrete sections 36 of a buoyant foam material. However, the principles of the present invention are equally applicable to a foundation that includes piles or other structures anchored at the bottom of the waterway. The sections have a width of about three (3) feet and are arranged end-to-end to form three straight lengths 38 that are interconnected by the frame 24 to define interior sides 40 of the dock 12, and a dock entry 42. The sides 40 and entry 42 thus define the dock slip 14. The slip 14 is rectangular and includes a front 44 adjacent to the entry 42, sides 46, and back 48. While the illustrated dock 12 is rectangular in shape and surrounds three sides of the rectangular slip 14, the principles of the present invention are equally applicable to alternative dock shapes that may define alternative slip shapes or surround a slip to a lesser or greater extent.

The floor 26, as discussed above, is supported within the frame 24 and is spaced above the foundation 22. The floor 26 is substantially flat and overlies the entire uppermost surface of the foundation 22. The floor 26, in the usual manner, provides a platform suitable for ingress and egress from the boat B. The foundation 22, frame 24, and roof 28 allow the dock 12 to be buoyant and also give the dock 12 an integral structure that permits the dock 12 to flex and move in response to wave action of the water or other external forces.

As mentioned above, the dock 10 includes bumpers 16,18,20 for cushioning the boat B within the slip 14 and during boat ingress or egress from the slip 14. Turning to FIGS. 3–7, the dock entry bumper 16 includes a frame 50 with inner and outer uprights 52,54 and shiftable connectors 56 that interconnect the uprights 52,54. The inner upright 52 includes an angle 58 and flanges 60 that are integral to each other. The outer upright 54 includes a channel 62 and an end plate 64 that are also integral to each other. The frame 50 also includes flanges 66 so that flanges 60,66 are spaced on opposite sides of the stanchion 34. Fasteners 68 secure flanges 60,66 so that the frame 50 is removably attached to the stanchion 34 adjacent to the dock entry 42.

Figure 3:
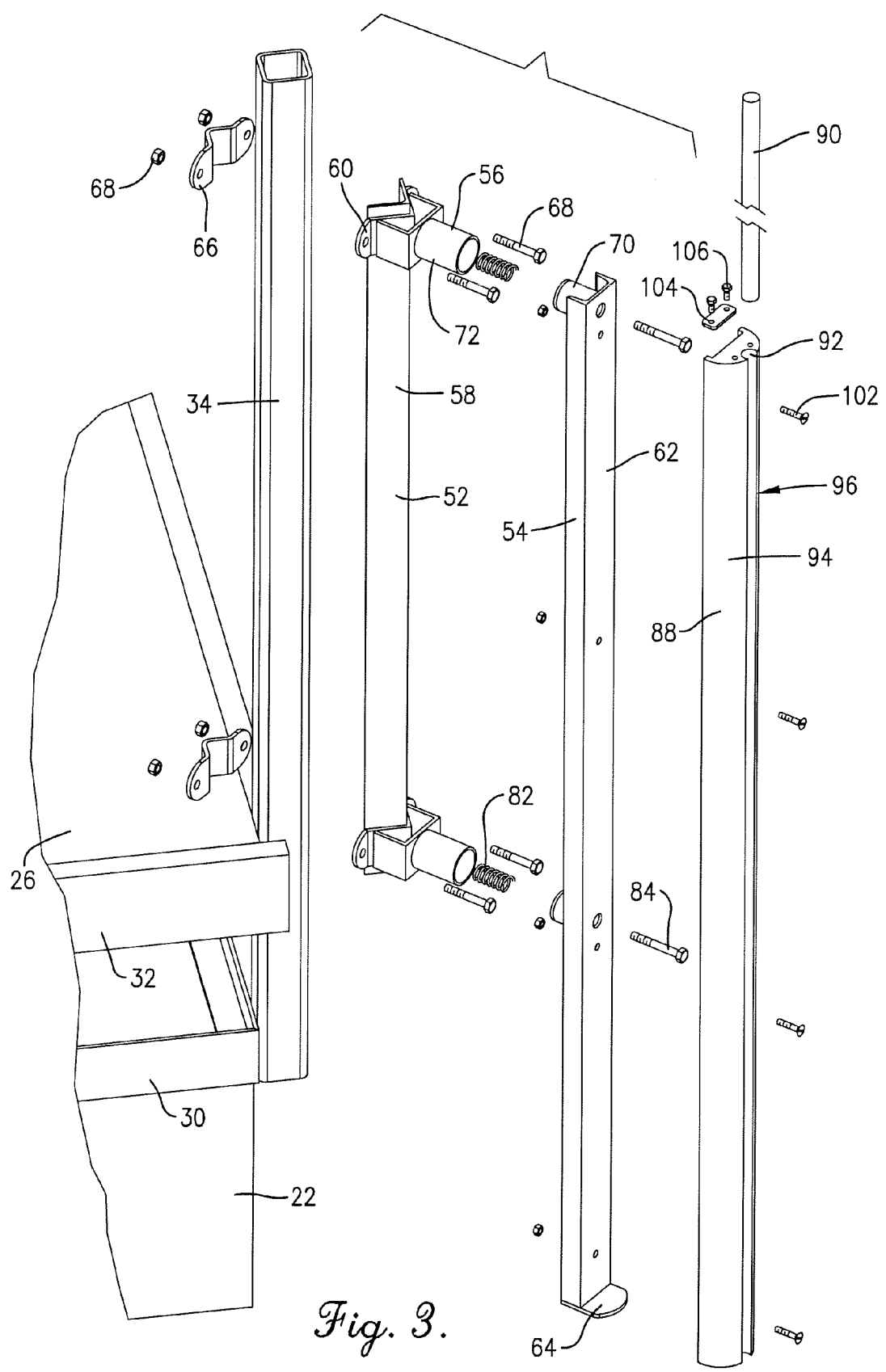
FIG. 3 is a fragmentary, partially-exploded, perspective view of the boat dock shown in FIGS. 1–2, showing a dock entry bumper.
Figure 4:
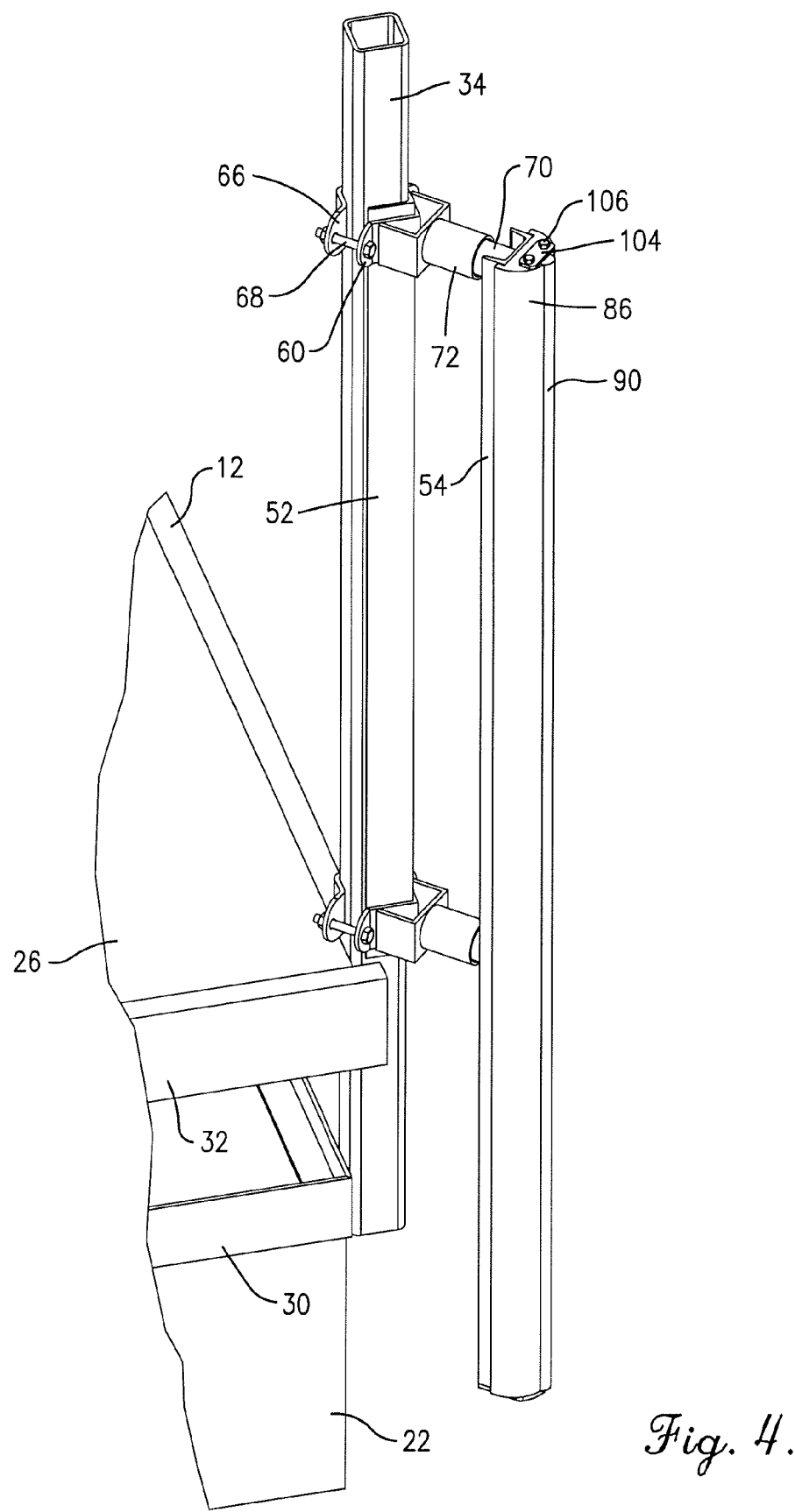
FIG. 4 is a fragmentary perspective view of the boat dock shown in FIG. 3, showing the dock entry bumper in the neutral position.

The connectors 56 include male and female portions 70,72 (see FIGS. 3 and 7). The female portion 72 is integral to the inner upright 52 and includes a bracket 74 that is fixed to the flange 60 and a cylindrical sleeve 76 that is fixed to the bracket 74. The male portion 70 is integral to the outer upright 54 and includes a cylindrical sleeve 78 and an end plate 80. One end of the sleeve 78 is fixed to the outer upright 54 with the other end being fixed to the end plate 80.

The sleeve 78 includes an outer diameter that is slightly smaller than the inner diameter of the sleeve 76. Thus, male portion 70 can be received within female portion 72 so that the portions 70,72 are telescopically shiftable relative to each other. The portions 70,72 are preferably only slidably engaging and thus restrict relative pivotal movement. However, while the non-pivotal movement between portions 70,72 is important with respect to the present embodiment, the principles of the present invention are also applicable where the portions 70,72 are pivotally attached to each other.

The connectors 56 further include a spring 82 and fasteners 84 that secure the male and female portions 70,72 to each other. The fastener 84 extends through holes in the bracket 74 and end plate 80 and engages the bracket 74 and end plate 80 to define an outermost relative position between the portions 70,72. The fastener 84 retains the sleeve 78 within sleeve 76 and prevents relative movement beyond the outermost relative position.

The spring 82, secured by fasteners 84, is spaced within sleeve 76 and between the end plate 80 and the bracket 74. Furthermore, the spring 82 is sized to be in a compressed condition when the portions 70,72 are in the outermost relative position (see FIG. 6). Thus, when the portions 70,72 are advanced toward each other from the outermost relative position, the spring 82 is further compressed within the sleeve 76 (see FIG. 7). In this manner, the spring 82 is always under compression when the connector 56 is assembled and thereby urges the portions 70,72 into the outermost relative position. Although such a compressive arrangement is desired, it will be appreciated that the principles of the present invention are equally applicable to having the spring "uncompressed" when the uprights are in their relatively greatest spaced apart position and the spring is compressed only when the upright 54 is shifted toward the upright 52.

Figure 6:
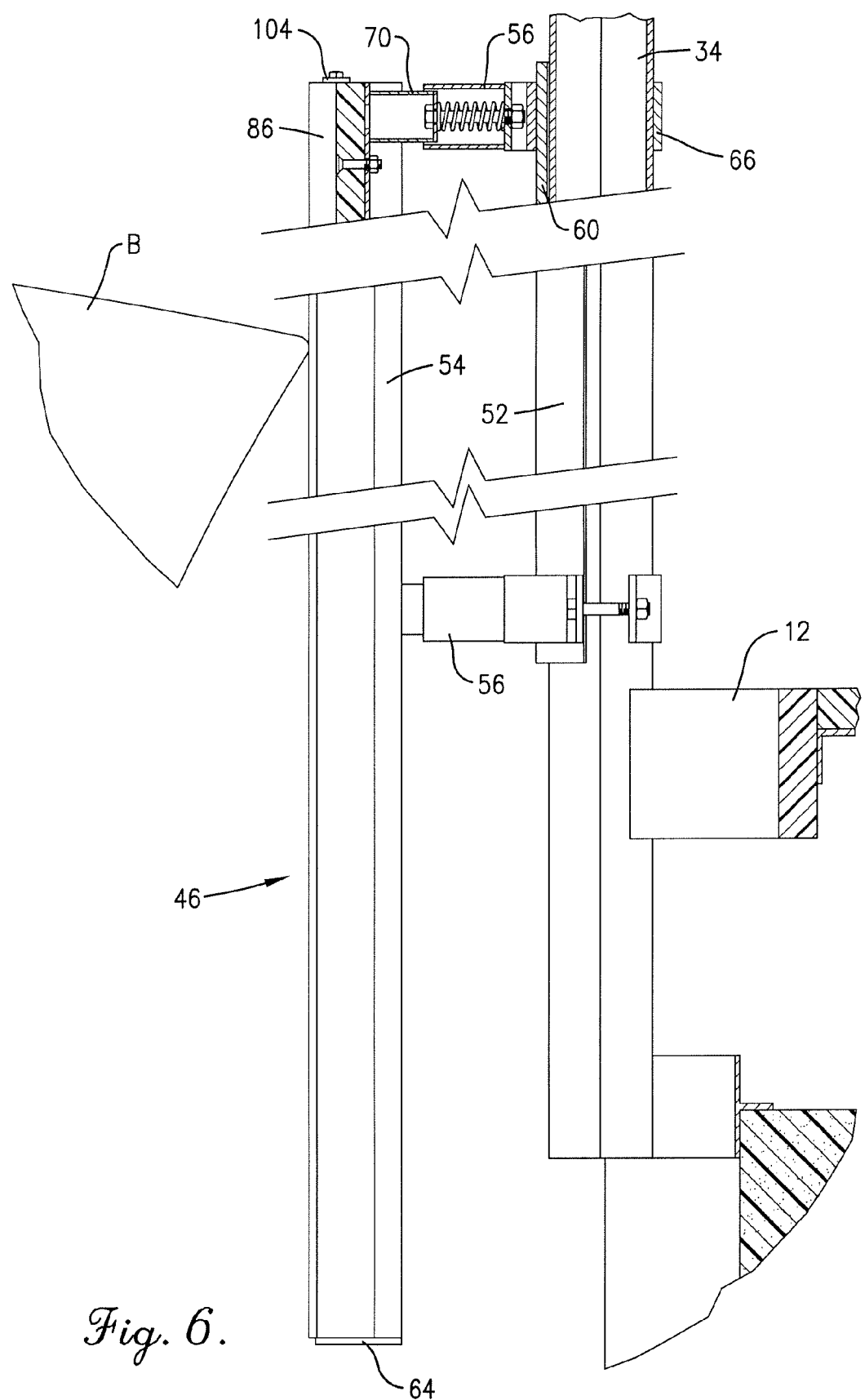
FIG. 6 is a fragmentary, partially cross-sectional view of the boat dock taken along line 6—6 of FIG. 5.

With the connectors 56 urged into the outermost relative position, frame upright 54 is also urged into an outermost position when the frame 50 is installed on dock 12 (see FIG. 6). The upright 54 may be deflected from the outermost position toward the upright 52 by force F applied to the upright 54 (see FIG. 7), but the upright 54 is urged to return to the outermost position as the force F is released. While the preferred frame 50 urges the upright 54 into the outermost position, the principles of the present invention are applicable to the upright 54 being urged into some other neutral position, other than the outermost position, where the neutral position is a position that the upright 54 normally shifts to when no external forces are applied to the frame.

The connectors 56 permit lateral translational movement of the upright 54 and also preferably restrict pivotal movement of the upright 54. The pivotal movement is restricted by sizing the sleeves 76,78 so that the inner sleeve 78 has a slightly larger outer diameter than an inner diameter of sleeve 76. In this manner, upright 54 may be shifted translationally with substantially no pivotal movement. Although this non-pivotal movement is important with respect to the present embodiment, the principles of the present invention are also applicable where the connectors 56 include a pivot mechanism that permits pivotal movement of the upright 54 as will be shown in a subsequent embodiment.

The connectors 56 not only permit movement of the upright 54 and urge the upright 54 into the outermost position, but also isolate the upright 52 from movement experienced by upright 54. In other words, the connectors 56, through the use of spring 82, act as vibration isolators and thereby protect the dock 12 and boat B from inadvertent shock or damage due to contact. In other words, the connectors 56 absorb energy that would otherwise be transmitted between the dock 12 and boat B. While the preferred embodiment of the bumper 16 includes connectors 56 with a spring 82, the principles of the present invention are also applicable to a bumper 16 that includes a damping mechanism or a combination of spring and damping mechanisms to isolate the uprights 52,54 from each other and to thereby isolate the dock 12 from the boat B as it is being berthed next to the dock 12.

The dock entry bumper 16 also includes a bumper body 86 with a base 88 and a roller insert 90. The body 86 is elongated and preferably has a length of about six (6) feet between spaced-apart ends. As will be discussed, the roller insert 90 includes sections (not shown) that are preferably about one (1) foot in length and are arranged end-to-end. The base 88 includes a bore 92 extending along the length of the base 88 that provides a socket for receiving the roller insert 90. The base 88 also includes a convex engagement surface 94 that, in the illustrated embodiment, is cylindrical. However, the principles of the present invention are also applicable to the base 88 including other forms of convex surfaces. The convex surface 94 is spaced on opposite sides of the bore 92 and the bore 92 intersects the convex surface 94 to form an opening 96. Thus, the bore 92 is positioned substantially adjacent to an apex of the base 88 and the bore 92 preferably defines a finite arc within the base 88 so that the convex surface 94 communicates with the bore 92. More preferably, the bore 92 defines an arc within the base 88 of about 225. The base 88 further includes a mounting surface 98 that presents a recessed portion 100. The convex surface 94, opening 96, and mounting surface 98 also extend along the length of the base 88.

The base 88 and roller insert 90 preferably include a plastic material. More preferably, the plastic material is an extrudable Ultra High Molecular Weight (UHMW) polyethylene. The UHMW polyethylene includes a low coefficient of friction that permits the roller insert 90 to rotate relative to the base 88 with relatively low friction between the roller insert 90 and the bore 92. The principles of the present invention are also applicable where the base 88 and roller insert 90 include materials such as wood, elastomer, or metal.

The roller insert 90 preferably includes a phosphorescent material that is mixed with the UHMW polyethylene. The phosphorescent material is added to the UHMW polyethylene to create an extrudable mixture with the phosphorescent material preferably being between about 3% to 12% of the mixture by weight. More preferably, the phosphorescent material is about 5% to 10% of the mixture by weight and, most preferably, is about 10% of the mixture by weight. The preferred phosphorescent material is Material Code No. L0-0286-EDC and is manufactured under the trade name NIGHT GLOW by Lanier Color of Gainesville, Ga. Preferably, only the roller insert 90 includes the phosphorescent material. More preferably, only one of the short sections of the roller insert 90 includes the phosphorescent material. However, the principles of the present invention are applicable where more than one roller section includes phosphorescent material or where the base 88 or other components of the bumper 16 include phosphorescent material.

The base 88 and roller insert 90 are preferably formed by a plastic extrusion process. However, due to the presence of the phosphorescent material, the roller insert 90 develops a charred outermost layer as it is extruded. Therefore, the roller insert 90 is also preferably machined following the extrusion process in order to remove the charred outermost layer. This machining step requires that the roller insert 90 be made of relatively short one-foot sections as discussed above. While extrusion is preferable for manufacturing the base 88 and roller insert 90, the principles of the present invention are equally applicable to the base 88 and roller insert 90 being manufactured by other plastic forming processes such as injection molding.

The phosphorescent material permits the base 88 and roller insert 90 to absorb radiation (i.e., sunlight) and re-radiate light thereafter for an extended period of time, thus allowing the base 88 and roller insert 90 to radiate or glow in the dark. For some aspects of the present invention, it is consistent with those aspects that other mechanisms can permit the base 88 and roller insert 90 to emit light in the dark. For example, the base 88 or roller insert 90 could incorporate one or more light bulbs that generate light and are powered by a source of electricity. Also, the base 88 or roller insert 90 could include a reflective material that emits light by reflecting light radiated by a light source (e.g., from a light bulb located on an approaching boat).

Figure 5:
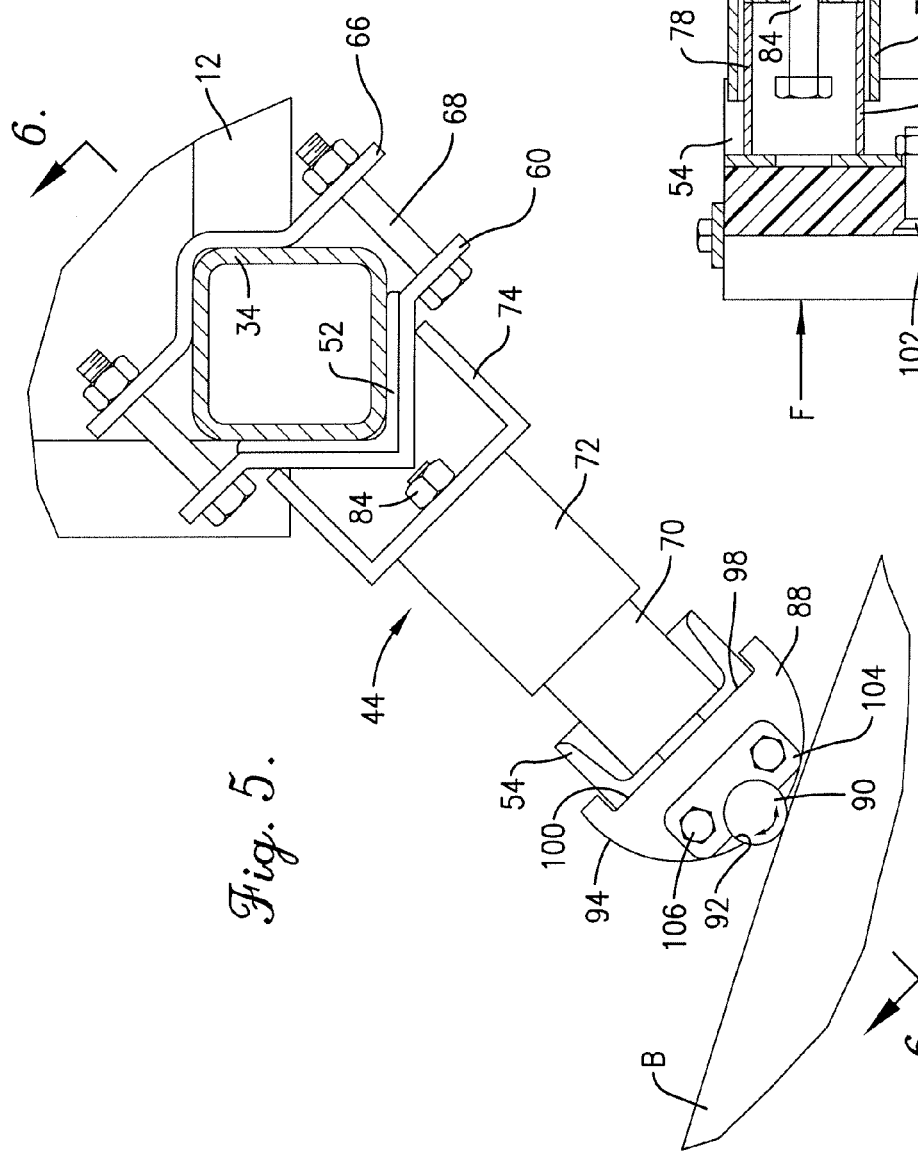
FIG. 5 is a fragmentary top view of the boat dock shown in FIGS. 3–4, showing the dock entry bumper in the neutral position as it is initially contacted by the boat.

Turning to FIGS. 5 and 6, the sections of the roller insert 90 are arranged end-to-end within the socket of the base 88. The sections are rotatably received within the socket (as indicated by arrows in FIG. 5) and are preferably rotatable when contacted by boat B. The arc defined by the bore 92 covers the sections along an angle preferably greater than 180 and more preferably about 225. Thus, the undercut sides of the bore 92 receive the roller insert 90 and retain the roller insert 90 from being moved through the opening 96. Additionally, the base 88 covers roller insert 90 along the defined arc and restricts access to the roller insert 90 along that arc. In this manner, the base 88 prevents inadvertent snagging or pinching of objects by the roller insert 90 along the covered portion of the engagement surface. While the preferred roller insert 90 is restricted from lateral movement by the wall that defines the bore 92, certain principles of the present invention are applicable to the roller insert 90 being supported by other mechanisms such as a roller bearing, or a pin extending through the center of the roller insert 90.

The base 88 is attached to the outer upright 54 by arranging the upright 54 within the recessed portion 100 and securing it thereto with fasteners 102. The base 88 also abuts the end plate 64. The roller insert 90 is prevented from moving axially out of the bore 92 by the end plate 64 and by attaching an end plate 104 to the opposite end of the base 88 with fasteners 106.

Figures 8, 9, 10:
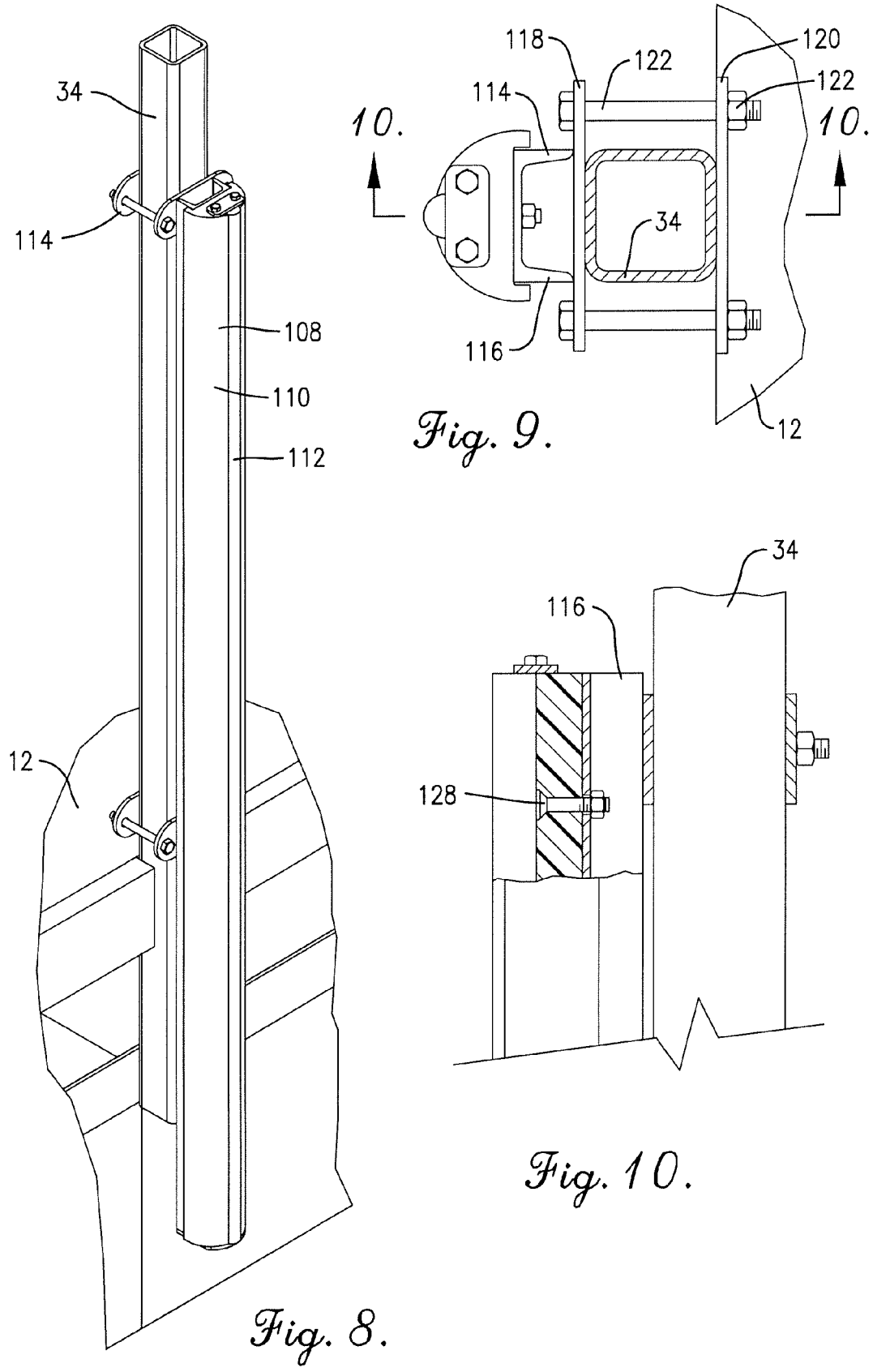
FIG. 8 is a fragmentary perspective view of the boat dock shown in FIGS. 1–2, showing a dock side bumper.
FIG. 9 is a fragmentary, horizontal cross-sectional view of the boat dock shown in FIG. 8.
FIG. 10 is a fragmentary, cross-sectional view taken along line 10—10 of FIG. 9.

Turning to FIGS. 8–10, the side bumper 18 includes a body 108 with a base 110 and a roller insert 112. The side bumper 18 further includes a frame 114 with an upright 116, flanges 118,120, and fasteners 122. The flanges 118 are fixed to the upright 116 and secure the upright 116 to the stanchion 34 by positioning the flanges 118,120 on opposite sides of the stanchion 34 and securing the fasteners 122 to the flanges 118,120 to clamp the flanges 118,120 to the stanchion 34. The side bumper 18 is similar to the dock entry bumper 16 except that the body is rigidly attached to the dock 12. However, the principles of the present invention are also applicable where the side bumper 18 provides a cushioning mechanism between the body and the dock, similar to the dock entry bumper 16.

Referring to FIG. 10, the base 110 includes a bore 124 and a convex surface that cooperatively form an opening 126 extending along the length of the base 110. The base 110 is otherwise similarly configured to the base 88 so as to rotatably receive the roller insert 112. The base 110 is attached to the upright 116 by extending a fastener 128 through a hole in the base 110. The hole communicates with the bore 124 and the opening 126 so that a threaded bolt of fastener 128 may be passed through the opening 126 and into the hole. A hex nut of the fastener 128 is tightened against an interior surface of the upright 116 to thereby secure the base 110 to the upright 116.

Figure 11:
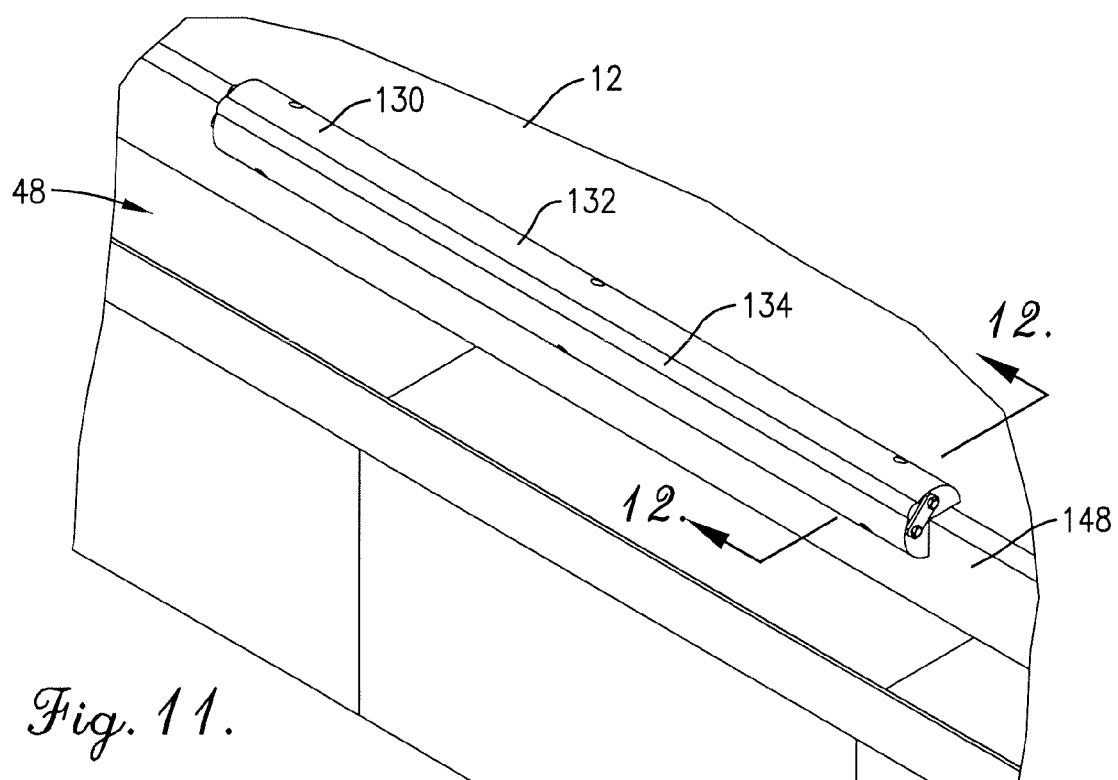
FIG. 11 is a fragmentary perspective view of the boat dock shown in FIGS. 1–2, showing a dock end bumper.
Figure 12:
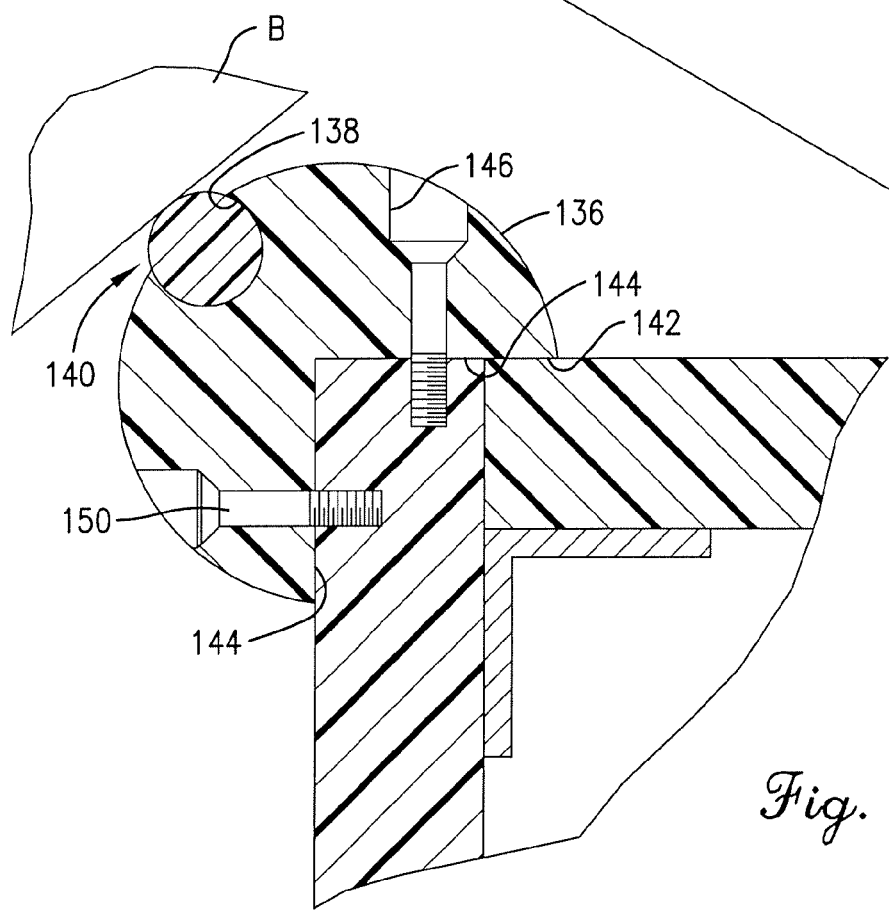
FIG. 12 is a fragmentary, cross-sectional view of the boat dock taken along line 12—12 of FIG. 11, showing the dock end bumper as it is contacted by the boat's bow.

Turning to FIGS. 11 and 12, the end bumper 20 includes a body 130 with a base 132 and a roller insert 134, similar to the dock entry bumper 16 and the side bumper 18. The base 132 includes a convex surface 136 and a bore 138 which cooperatively define an opening 140 along the base 132. The base 132 further includes a mounting surface 142. The mounting surface 142 includes two sides 144 that are angularly positioned relative to each other. In the illustrated embodiment, the sides 144 are orthogonal to each other. In addition, the base 132 includes countersunk holes 146. The body 130 is directly and rigidly attached to the dock 12 by arranging the sides 144 so that they engage an edge 148 of the dock 12. Threaded fasteners 150 extend through the countersunk holes 146 to threadedly engage the dock 12. While the body 130 is directly attached to the floor 26, the principles of the present invention are also applicable where the end bumper 20 includes a frame for attaching the body 130 to the dock 12. It is also within the ambit of the present invention for the end bumper 20 to include a mechanism for providing isolation between the body 130 and the dock 12, similar to the dock entry bumper 16.

In operation, the boat B is docked by initially approaching the front of the slip 14 with the boat's bow leading the stern. Referring to FIG. 2, the boat B contacts the dock entry bumper 16 if the boat B is not sufficiently aligned with the slip 14 as it enters the slip 14 (see FIG. 5). As the boat B moves further into the slip 14, the boat B may contact one or more of the side bumpers 18 (see FIG. 6). When the boat B is fully received within the slip 14, the bow may also contact the end bumper 20 (see FIG. 12).

Figure 13:
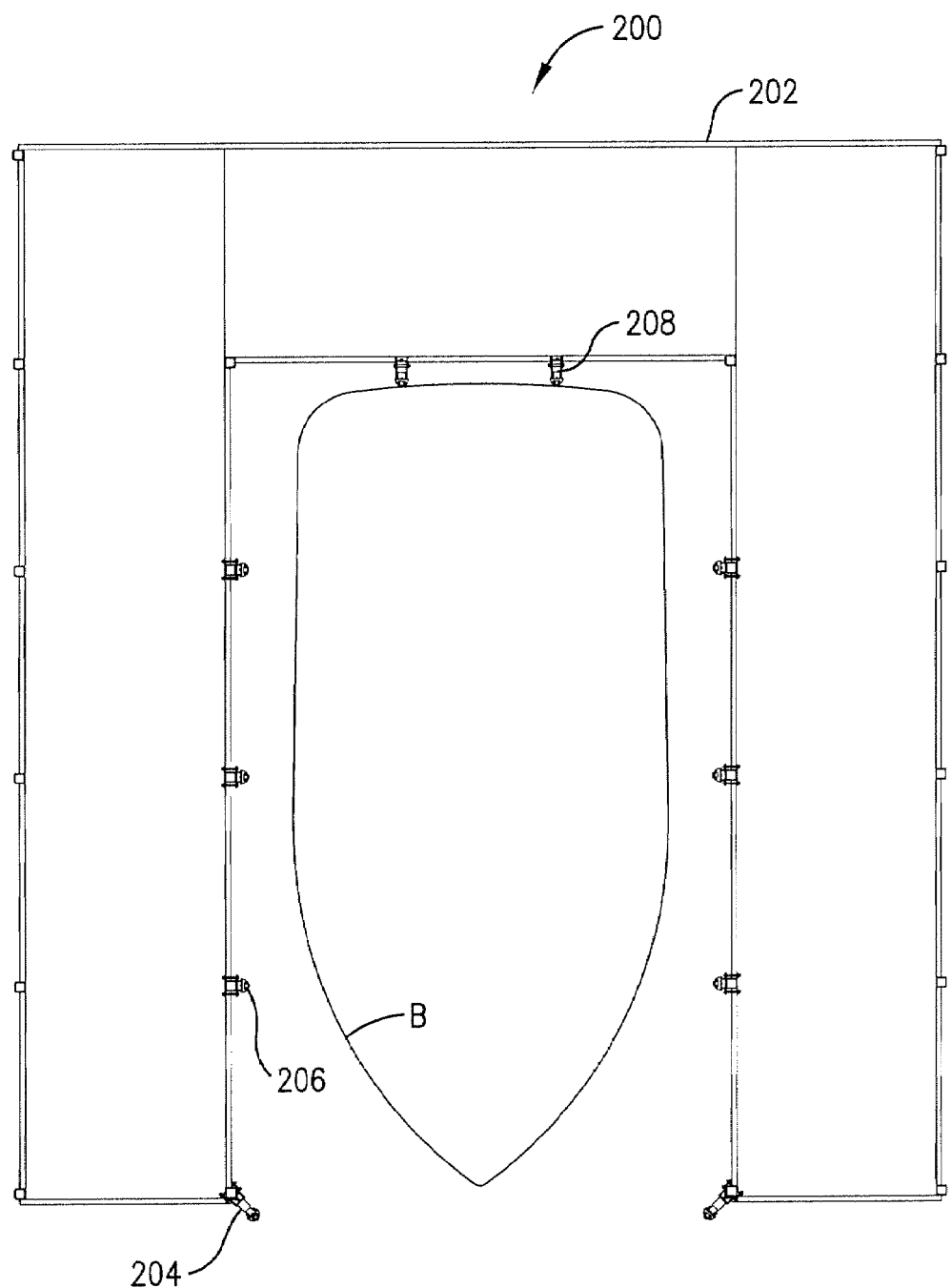
FIG. 13 is a top view of a boat dock including a boat bumper constructed in accordance with a second embodiment of the present invention.
Figure 14:
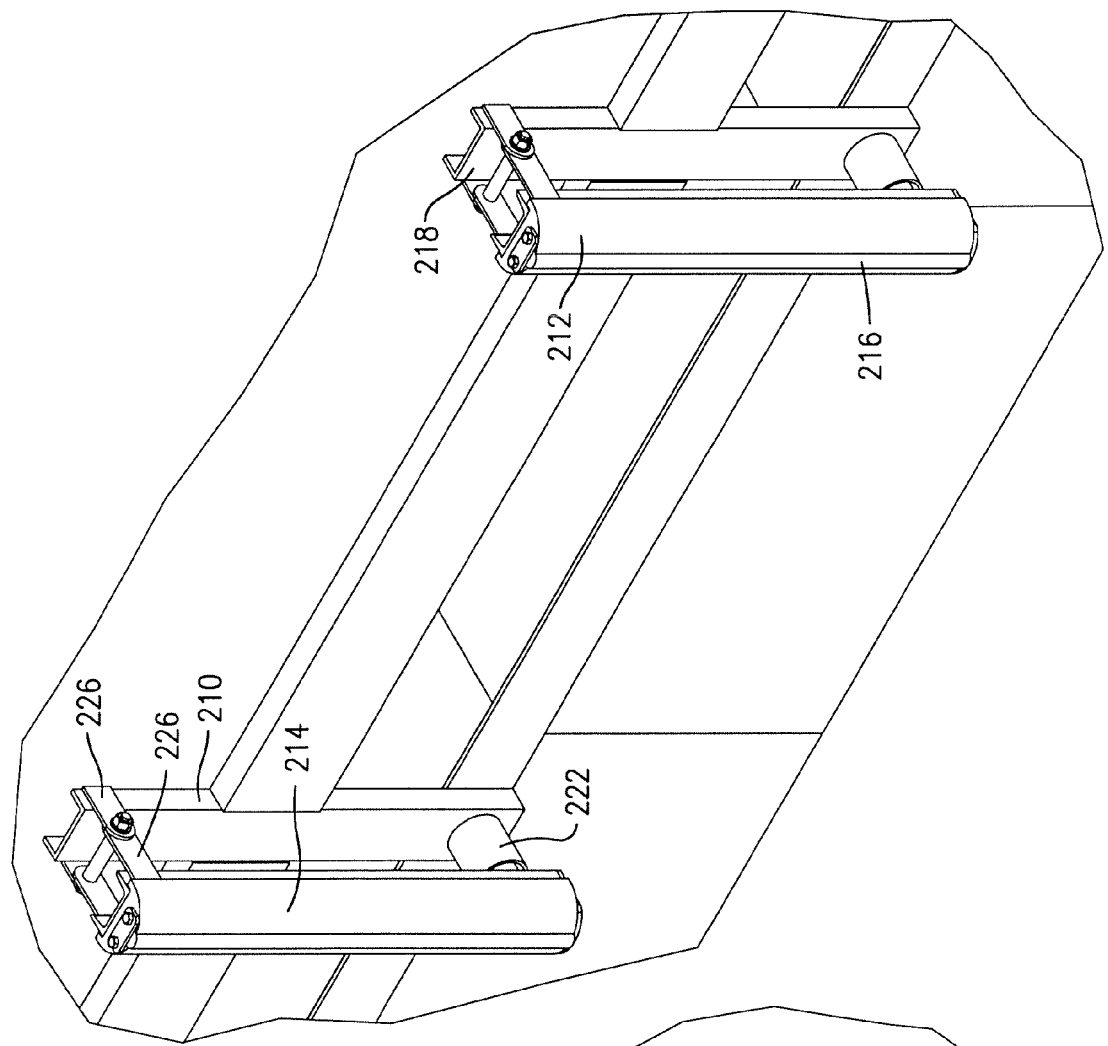
FIG. 14 is a fragmentary perspective view of the boat dock shown in FIG. 13, showing alternative dock end bumpers in the neutral position.
Figure 15:
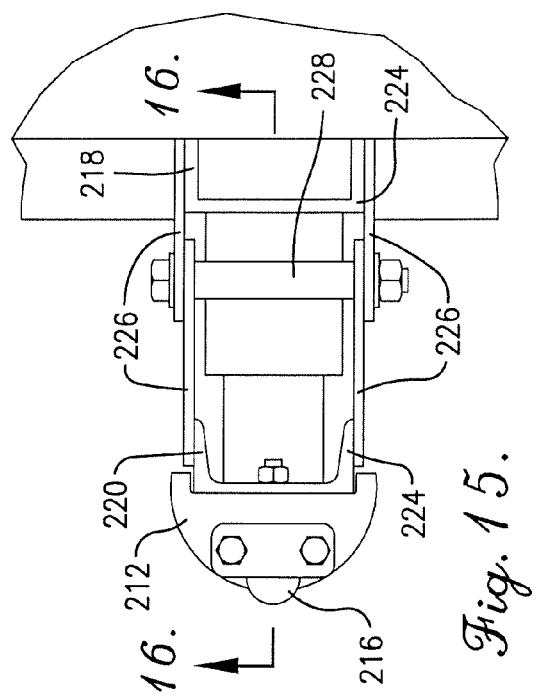
FIG. 15 is a fragmentary top view of the boat dock shown in FIGS. 13–14, particularly illustrating one of the end bumpers.

Turning to FIGS. 13–17, a second embodiment of the present invention is depicted. For the sake of brevity, the remaining description will focus primarily on the differences of this alternative embodiment from the first embodiment. Referring to FIG. 13, an alternative buffered dock 200 is shown with the boat B berthed therein. The buffered dock 200 includes a dock 202, a dock entry bumper 204, dock side bumper 206, and alternative end bumpers 208.

The end bumper 208 includes a frame 210 and a body 212 attached to the frame 210. The body 212 includes an upright base 214 and a roller insert 216 and is similarly constructed to the body 86 discussed above.

The frame 210 includes hinged uprights 218,220 and a connector 222. The hinged uprights 218,220 each include a channel section 224 and arms 226 fixed to the channel section 224 at one end thereof. The arms 226 include holes for receiving a pin 228. The arms 226 and pin 228 form a hinge that permits the uprights 218,220 to pivot relative to each other about a horizontal axis.

The frame 210 is attached to the dock 202 by fixing the upright 218 to the dock 202. Thus, the upright 220 is pivotal relative to the dock 202 about the hinge formed by the uprights 218,220. The connector 222 interconnects the uprights 218,220 at a position spaced below the hinge. The connector 222 includes male and female portions with the female portion being relatively larger than the male portion to permit some relative arcuate movement as a result of the hinged connection. Thus, the connector 222 limits pivotal movement of the upright 220 and isolates the upright 218 from movement of the upright 220 as discussed above in the previous embodiment.

Referring to FIGS. 16 and 17, the alternative end bumpers 208 are particularly useful for engaging the boat B when the stern enters the slip first to engage the end bumpers 208. At the initial point of engagement between the boat B and the bumper 208, the connector 222 is fully extended. As lateral force is applied by the boat B, the body 212 and upright 220 are deflected so that pivotal movement occurs about the hinge and the connector 222 is compressed. Thus, the end bumper 208 provides a cushioning mechanism that urges the body 212 into an outermost position.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A boat bumper for attachment to a boat securement in which a boat is secured, said boat bumper comprising:

a body configured to engage the boat within the boat securement, said body including spaced apart first and second ends, a longitudinal axis extending between the ends, and a boat-engagement surface extending along the longitudinal axis of the body; and a frame operable to attach the body to the boat securement and permit limited relative movement therebetween, said frame including a mechanism that supports the body for pivoting movement about a pivot axis that is substantially perpendicular to the longitudinal axis, said mechanism including a hinged connector defining the pivot axis, said mechanism including a cushioning connector operable to absorb forces applied when the boat contacts the boat-engagement surface, said cushioning connector being spaced along the longitudinal axis from the hinged connector, with the boat-engagement surface being defined between the connectors.

2. The boat bumper as claimed in claim 1,
each of said connectors being located adjacent respective ones of the ends.

3. The boat bumper as claimed in claim 1,
said body including a light-emitting section so that the body can be viewed in otherwise low-light conditions adjacent the body,
said light-emitting section emitting light and thereby providing a visual indication corresponding to a location of the boat securement.

4. A boat bumper for attachment to a boat securement in which a boat is secured, said boat bumper comprising:

a body configured to engage the boat within the boat securement, said body including spaced apart first and second ends, a longitudinal axis extending between the ends, and a boat-engagement surface extending along the longitudinal axis of the body; and a frame operable to attach the body to the boat securement and permit limited relative movement therebetween, said frame including a mechanism that supports the body for pivoting movement about a pivot axis that is substantially perpendicular to the longitudinal axis, said mechanism including a hinged connector defining the pivot axis, said mechanism including a cushioning connector operable to absorb forces applied when the boat contacts the boat-engagement surface, said cushioning connector including a neutral position,
at least a portion of said cushioning connector being angularly shiftable along a finite arc from the neutral position so that the connector permits limited pivotal movement of the body about the pivot axis.

5. The boat bumper as claimed in claim 4,
said cushioning connector including a spring that yieldably biases the body into the neutral position,
said mechanism permitting the body to be displaced from the neutral position when contacted by the boat and returned to the neutral position thereafter.

6. The boat bumper as claimed in claim 5,
said frame including spaced apart sections that are shiftable relative to each other,
one of said sections being attached to the body and another of said sections configured to be attached to the boat securement,
said connectors interconnecting the sections of the frame.

7. The boat bumper as claimed in claim 6,
said cushioning connector including portions, each of which is fixed to a respective one of the sections,
said portions being telescopically interfitted.

8. The boat bumper as claimed in claim 7,
said portions each receiving the spring and securing the spring within the mechanism.

9. The boat bumper as claimed in claim 7,
said hinged connector including tabs, each of which is fixed to a respective one of the sections,
said hinged connector including a pin pivotally interconnecting the tabs and extending along the pivot axis.

10. A boat bumper for attachment to a boat securement in which a boat is secured, said boat bumper comprising:

a body configured to engage the boat within the boat securement, said body including spaced apart first and second ends, a longitudinal axis extending between the ends, and a boat-engagement surface extending along the longitudinal axis of the body; and a frame operable to attach the body to the boat securement and permit limited relative movement therebetween, said frame including a mechanism that supports the body for pivoting movement about a pivot axis that is substantially perpendicular to the longitudinal axis, said mechanism including a hinged connector defining the pivot axis, said frame including spaced apart sections that are shiftable relative to each other, one of said sections being attached to the body and another of said sections being attachable to the boat securement, said hinged connector including pivotal arms, each of which is fixed to a respective one of the sections, said hinged connector including a pin pivotally interconnecting the arms and extending along the pivot axis.

11. The boat bumper as claimed in claim 10,
said mechanism including a cushioning connector operable to absorb forces applied when the boat contacts the boat-engagement surface.

12. A boat bumper for attachment to a boat securement in which a boat is secured, said boat bumper comprising:

a bumper body attachable to the boat securement and configured to engage the boat within the boat securement, said bumper body including a substantially rigid base and a cylindrical roller, said roller including a circumferential contacting surface operable to engage the boat, said base presenting a socket rotatably receiving the roller therein such that the roller is operable to rotate relative to the base in response to engagement with the boat, said socket being dimensioned and configured so that the base extends about at least half of the contacting surface to thereby retain the roller within the socket.

13. The boat bumper as claimed in claim 12,
said base including a convex engagement surface,
said roller projecting outwardly from the engagement surface when received within the socket,
said engagement surface including an outermost apex,
said socket being located at the apex.

14. The boat bumper as claimed in claim 12,
said base including a longitudinal engagement surface, with the roller extending along the engagement surface,
said socket intersecting the engagement surface so as to be open along the length thereof, said roller projecting outwardly from the surface and thereby being operable to engage the boat.

15. The boat bumper as claimed in claim 14, said base extending approximately 225 degrees around the contacting surface of the roller.

16. The boat bumper as claimed in claim 15, said socket including undercut sides which are arcuate in shape and configured to engage the roller to retain the roller within the socket.

17. The boat bumper as claimed in claim 14, said socket and said roller being coextensive.

18. The boat bumper as claimed in claim 12, said base and said roller each being formed of a plastic material.

19. The boat bumper as claimed in claim 18, said plastic material including a UHMW polyethylene material.

20. The boat bumper as claimed in claim 12, said body including spaced apart first and second ends, a longitudinal axis extending between the ends, and a boat-engaging surface extending along the longitudinal axis of the body, wherein the boat-engaging surface is at least partially defined by the contacting surface of the roller; and
a frame operable to removably attach the body to the boat securement and permit limited relative movement therebetween,
said frame including a mechanism that supports the body for pivoting movement about a pivot axis that is substantially perpendicular to the longitudinal axis,
said mechanism including a hinged connector defining the pivot axis.

21. The boat bumper as claimed in claim 12, said body including a light-emitting section so that the body can be viewed in otherwise low-light conditions adjacent the body,
said light-emitting section emitting light and thereby providing a visual indication corresponding to a location of the boat securement.

22. The boat bumper as claimed in claim 12, said body including a substantially rigid base,
said base including a longitudinal axis, spaced apart first and second ends, and a boat-engagement surface extending along the longitudinal axis of the base and between the ends; and
a movement-isolating frame operable to removably attach the body to the boat securement,
said frame including spaced apart sections that are shiftable relative to each other,
one of said sections being fixed to the base and another of said sections configured to be attached to the boat securement,
said frame including a mechanism that interconnects the sections,
said mechanism being operable to urge the sections so that the body is located in a neutral position and to permit lateral shifting of the body from the neutral position in response to contact by the boat,
said mechanism including first and second cushioning connectors adjacent to respective first and second ends with said connectors being operable to absorb forces applied when the boat contacts the boat-engagement surface,
at least a portion of said connectors being linearly shiftable from the neutral position to permit lateral translational movement of the body while substantially restricting pivotal movement of the base.

23. A boat bumper for attachment to a boat securement in which a boat is secured, said boat bumper comprising:
a bumper body removably attached to the boat securement and configured to engage the boat within the boat securement,
said body including a phosphorescent section so that the body can be viewed in otherwise low-light conditions adjacent the body,
said body including a longitudinal axis, spaced apart first and second ends, and a boat-engagement surface extending along the longitudinal axis of the base and between the ends,
said phosphorescent section extending between the first end and second ends to provide a visual indication corresponding to a location of the surface to facilitate direction of the boat.

24. The boat bumper as claimed in claim 23, said phosphorescent section being formed only partially of a phosphorescent material.

25. The boat bumper as claimed in claim 24, said light-emitting section including a mixture of UHMW polyethylene material and the phosphorescent material,
said phosphorescent material being between about 3% to 12% of the mixture by weight.

26. The boat bumper as claimed in claim 25, said phosphorescent material being between about 5% to 10% of the mixture by weight.

27. The boat bumper as claimed in claim 26, said phosphorescent material being about 10% of the mixture by weight.

28. The boat bumper as claimed in claim 23, said body including a substantially rigid base and a roller that is rotatably attached to the rigid base with the roller being configured to contact the boat,
said roller including the phosphorescent section.

29. The boat bumper as claimed in claim 28, said roller including a plurality of roller sections spaced along the base, with only one of said roller sections including the phosphorescent material.

30. The boat bumper as claimed in claim 23, said body including a substantially rigid base and a roller that is rotatably attached to and retained by the rigid base with the roller being configured to contact the boat,
said base and said roller each being formed of a plastic material.

31. The boat bumper as claimed in claim 30, said plastic material including a UHMW polyethylene material.

32. A boat bumper for attachment to a boat securement in which a boat is secured, said boat bumper comprising:
a body including a substantially rigid base configured to engage the boat within the boat securement,
said base including a longitudinal axis, spaced apart first and second ends, and a boat-engagement surface extending along the longitudinal axis of the base and between the ends; and
a cushioning frame operable to removably attach the body to the boat securement,
said frame including spaced apart sections that are shiftable relative to each other,
one of said sections being fixed to the base and another of said sections configured to be attached to the boat securement,
said frame including a mechanism that interconnects the sections, said mechanism being operable to urge the sections so that the body is located in a neutral position and to permit lateral shifting of the body from the neutral position in response to contact by the boat, said mechanism including first and second cushioning connectors adjacent to respective first and second ends, with said connectors being operable to absorb forces applied when the boat contacts the boat-engagement surface, at least a portion of said connectors being linearly shiftable from the neutral position to permit lateral translational movement of the body while substantially restricting pivotal movement of the base.

33. The boat bumper as claimed in claim 32, said cushioning connector including a spring that yieldably biases the body into the neutral position, said mechanism permitting the body to be displaced from the neutral position when contacted by the boat and returned to the neutral position thereafter.

34. The boat bumper as claimed in claim 33, said cushioning connectors including portions, each of which is fixed to a respective one of the sections, said portions being telescopically interfitted.

35. The boat bumper as claimed in claim 34, said portions each receiving the spring and securing the spring within the mechanism.

36. The boat bumper as claimed in claim 32, said body including a light-emitting section so that the body can be viewed in otherwise low-light conditions adjacent the body, said light-emitting section emitting light and thereby providing a visual indication corresponding to a location of the boat securement.

* * * * *